(12) United States Patent
Szeliski

(10) Patent No.: US 6,650,774 B1
(45) Date of Patent: Nov. 18, 2003

(54) LOCALLY ADAPTED HISTOGRAM EQUALIZATION

(75) Inventor: Richard S. Szeliski, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/411,619

(22) Filed: Oct. 1, 1999

(51) Int. Cl.$^7$ ................................................ G06K 9/00
(52) U.S. Cl. ...................... 382/169; 382/274; 348/672; 348/225.1
(58) Field of Search ................................ 382/264, 169, 382/274, 284, 172, 268, 271, 273, 168, 167; 358/461, 525, 520; 348/672, 225.1, 683, 655, 256, 223.1

(56) References Cited

U.S. PATENT DOCUMENTS

| | | | | |
|---|---|---|---|---|
| 5,140,649 A | * | 8/1992 | Kageyama | 382/169 |
| 5,287,418 A | * | 2/1994 | Kishida | 382/169 |
| 5,696,850 A | * | 12/1997 | Parulski et al. | 382/163 |
| 5,845,017 A | * | 12/1998 | Keyes | 382/264 |
| 6,148,103 A | * | 11/2000 | Nenonen | 382/169 |
| 6,175,427 B1 | * | 1/2001 | Lehmbeck et al. | 382/169 |

OTHER PUBLICATIONS

Vossepoel A M, et al.: "Adaptive Histogram Equalization Using Variable Regions", Proceedings of the International Conference on Pattern Recognition. (ICPR), US, Washington, IEEE Comp. Soc. Press, vol. Conf. 9, Nov. 14, 1988, pp. 351–353, XP000093898 ISBN: 0–8186–0878–1.

Caselles V, et al.: "Shape Preserving Local Contrast Enhancement", Proceedings of the International Conference on Image Processing, US, Los Alamitos, CA: IEEE, Oct. 26, 1997, pp. 314–317, XP000792774 ISBN: 0–8186–8184–5.

Gonzalez R C, et al.: "Digital Image Processing", pp. 186–187, Addison–Wesley, 1992.

\* cited by examiner

Primary Examiner—Amelia M. Au
Assistant Examiner—Colin LaRose
(74) Attorney, Agent, or Firm—Lyon & Harr; Mark A. Watson

(57) ABSTRACT

A system and method for improving the uniformity in exposure and tone of a digital image using a locally adapted histogram equalization approach. This approach involves first segmenting the digital image into a plurality of image patches. For each of these patches, a pixel brightness level histogram is created. The histogram for each patch is then optionally averaged with the histograms associated with a prescribed number of neighboring image patches. A normalized cumulative distribution function is generated for each patch based on the associated averaged histogram. This normalized-cumulative distribution function identifies a respective new pixel brightness level for each of the original pixel brightness levels. For each of the original pixel brightness levels, the 1s associated new pixel brightness levels from one or more of the image patches are blended. Preferably, this blending is accomplished using either a bilinear or biquadratic interpolator function. Finally, for each image patch, the original pixel brightness level of each pixel in the image patch is replaced with the blended pixel brightness level corresponding to that original brightness level. A further refinement can also be implemented to mitigate the effects of noise caused by areas of a single color in the scene depicted in patch. In one embodiment, this refinement entails employing a partially equalization approach. In another embodiment, the refinement entails limiting the gain exhibited by any of the blended pixel brightness levels associated with an image patch, in comparison to its associated original pixel brightness level, to a prescribed level.

38 Claims, 4 Drawing Sheets

(1 of 4 Drawing Sheet(s) Filed in Color)

LOCALLY ADAPTED HISTOGRAM EQUALIZATION

BACKGROUND

1. Technical Field

The invention is related to image processing in general, and more particularly, to a system and process for improving the uniformity in exposure and tone of a digital image using a unique histogram equalization procedure referred to as locally adapted histogram equalization.

2. Background Art

Digital cameras suffer from several deficiencies when compared with traditional photographic film. Among these are a lower dynamic range and a resulting inconsistency in the uniformity of both exposure and tone across an image captured by current digital cameras.

FIG. 1 presents a digital image which will be used to explain the dynamic range problem. FIG. 1 shows an image of the interior of an office. Specifically, this image was captured with a Kodak DCS-40 camera. The image of FIG. 1 represents an image taken at what was considered the "proper" exposure. Notice how the image contains areas that appear to be underexposed or overexposed. For example, the trees seen through the window appear to be overexposed, while the objects on the desk appear to be underexposed.

Histogram equalization is a popular technique in image processing that has been used in the past to mitigate the effects of the aforementioned inconsistency in the uniformity of the exposure and tone of a digital image. For example, histogram equalization can be used to stretch or compress the brightness of the pixels making up an image based on the overall distribution of pixel brightnesses in the image. This equalization process tends to produce a more balanced, realistic looking image having an extended dynamic range and more uniform exposure and tone characteristics. A traditional histogram equalization process involves creating a count of the number of pixels exhibiting a particular pixel brightness level (also known as the luminous intensity value) in an image. From this count, a cumulative distribution function is computed and normalized to a maximum value corresponding to the number of pixel brightness levels employed. The cumulative distribution function is then used as a lookup table to map from the original pixel brightness levels to final levels.

However, while this traditional histogram equalization technique is useful, it is generated from the entire image and so does not mimic the spatially localized adaptation present in the human visual system.

SUMMARY

The present invention implements a novel histogram equalization approach called locally adapted histogram equalization to overcome the aforementioned shortcoming of the global histogram equalization methods currently employed. The goal of this new approach is to produce a digital image exhibiting improved uniformity in exposure and tone by employing histogram equalization on a localized basis, i.e., to have the stretching and compression of pixel brightness levels be adapted to a local distribution of pixels in the image.

This approach is embodied in a system and process that first segments the digital image into a plurality of image patches. For each of these patches, a pixel brightness level histogram is created which identifies a respective pixel count for each of the plurality of original pixel brightness levels exhibited by the pixels of the patch. The histogram for each patch is then optionally averaged with the histograms associated with a prescribed number of neighboring image patches. A normalized cumulative distribution function is generated based on the averaged histogram. This function is essentially a standard cumulative distribution function which has been normalized such that the maximum cumulative count value corresponds to the maximum original pixel brightness level. The normalized cumulative distribution function identifies a respective new pixel brightness level for each of the original pixel brightness levels. These new pixel brightness levels are represented by the normalized pixel count value corresponding to each respective original pixel brightness level. For each of the original pixel brightness levels, the associated new pixel brightness levels from a prescribed number of neighboring image patches is preferably blended. While this blending is preferred, it could be skipped if the aforementioned optional histogram averaging is performed. Preferably, the blending is accomplished using a bilinear interpolator function, or a biquadratic interpolator function. If so, the amount of blending will depend on the relative position of the pixel within its patch. Finally, for each image patch, the original pixel brightness level of each pixel in the image patch is replaced with the blended pixel brightness level corresponding to that original brightness level. This produces a final image exhibiting the aforementioned improved uniformity in exposure and tone.

A further refinement can also be implemented to mitigate the effects of noise caused by areas of a single color in the scene depicted in the patch. In one embodiment, this refinement entails employing a partially equalization approach. Partial equalization can be described as the blending of the aforementioned normalized cumulative distribution function with a straight line function. While the foregoing blending operation does mitigate the effects of noise, it may not produce the optimum improvement in exposure and tone in the final image. Thus, it is preferred that the degree noise reduction be controlled by selecting the percentage of blending of the straight line function with the cumulative distribution function which produces the optimum improvement in exposure and tone (i.e. any blend between 0% and 100% is possible).

In another embodiment, the refinement entails limiting the gain exhibited by any of the blended pixel brightness levels associated with an image patch, in comparison to its, associated original pixel brightness level, to a prescribed level. This prescribed level is chosen so as to mitigate the effects of noise caused by areas of a single color in the scene depicted in the image patch while still producing the optimum improvement in exposure and tone.

In addition to the just described benefits, other advantages of the present invention will become apparent from the detailed description which follows hereinafter when taken in conjunction with the drawing figures which accompany it.

DESCRIPTION OF THE DRAWINGS

The file of this patent contains at least one drawing executed in color. Copies of this patent with color drawing(s) will be provided by the U.S. Patent and Trademark Office upon request and payment of the necessary fee.

The specific features, aspects, and advantages of the present invention will become better understood with regard to-the following description, appended claims, and accompanying drawings where:

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

Figure 2:
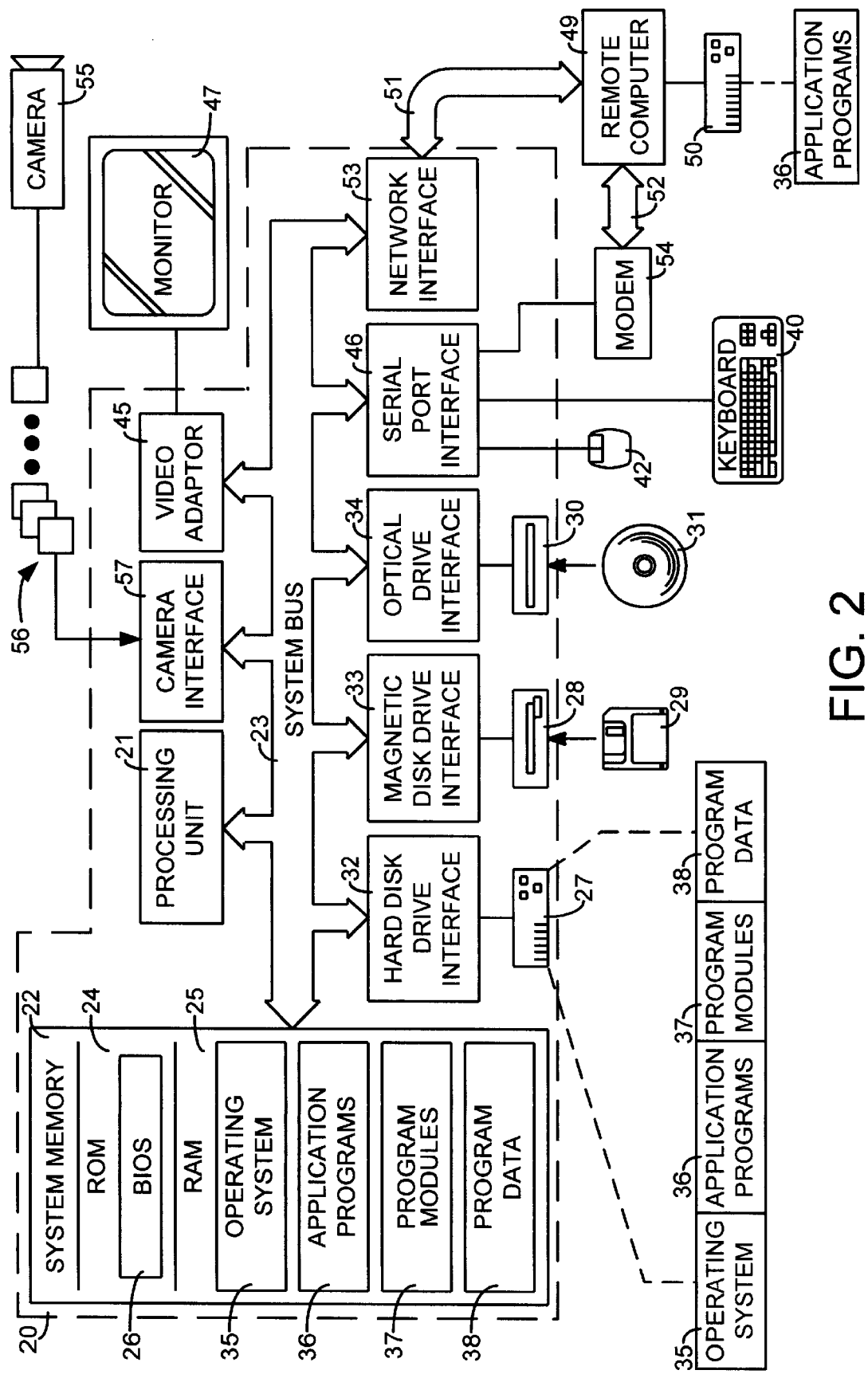
FIG. 2 is a diagram depicting a general purpose computing device constituting an exemplary system for implementing the present invention.

FIG. 2 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 2, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routine that helps to transfer information between elements within the personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs), and the like, may also be used in the exemplary operating environment.

A number of program modules may be stored on the hard disk, magnetic disk 29, optical disk 31, ROM 24 or RAM 25, including an operating system 35, one or more application programs 36, other program modules 37, and program data 38. A user may enter commands and information into the personal computer 20 through input devices such as a keyboard 40 and pointing device 42. Of particular significance to the present invention, a camera 55 (such as a digital/electronic still or video camera, or film/photographic scanner) capable of capturing a sequence of images 56 can also be included as an input device to the personal computer 20. The images 56 are input into the computer 20 via an appropriate camera interface 57. This interface 57 is connected to the system bus 23, thereby allowing the images-to be routed to and stored in the RAM 25, or one of the other data storage devices associated with the computer 20. However, it is noted that image data can be input into the computer 20 from any of the aforementioned computer-readable media as well, without requiring the use of the camera 55. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port or a universal serial bus (USB). A monitor 47 or other type of display device is also connected to the system bus 23 via an interface, such as a video adapter 48. In addition to the monitor, personal computers typically include other peripheral output devices (not shown), such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 2. The logical connections depicted in FIG. 2 include a local area network.(LAN) 51 and a wide area network (WAN) 52. Such networking environments are commonplace in offices, enterprise-wide computer networks, intranets and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The exemplary operating environment having now been discussed, the remaining part of this description section will be devoted to a description of the program modules embodying the locally adapted histogram equalization approach according to the present invention.

1.0. Locally Adapted Histogram Equalization

Figure 3A:
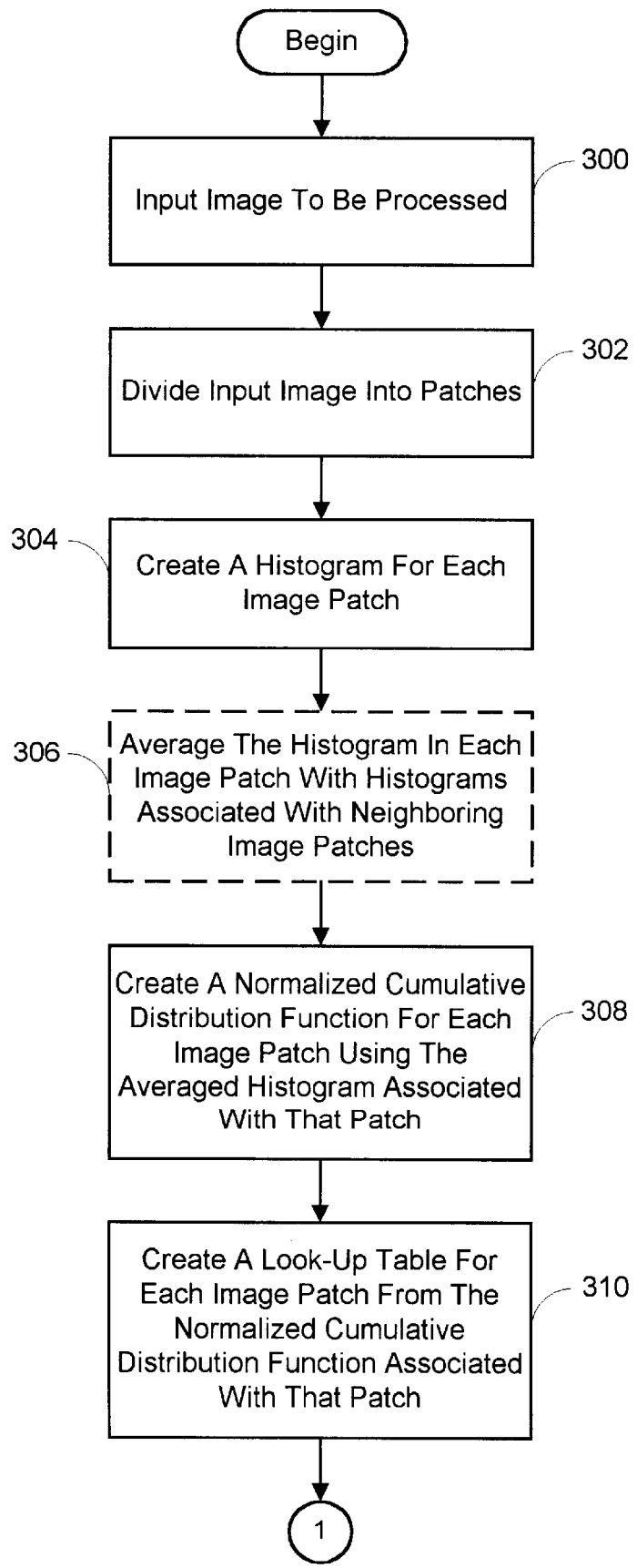
FIGS. 3A and 3B are block diagrams of a locally adapted histogram equalization process for improving the uniformity in exposure and tone of a digital image according to the present invention.
Figure 3B:
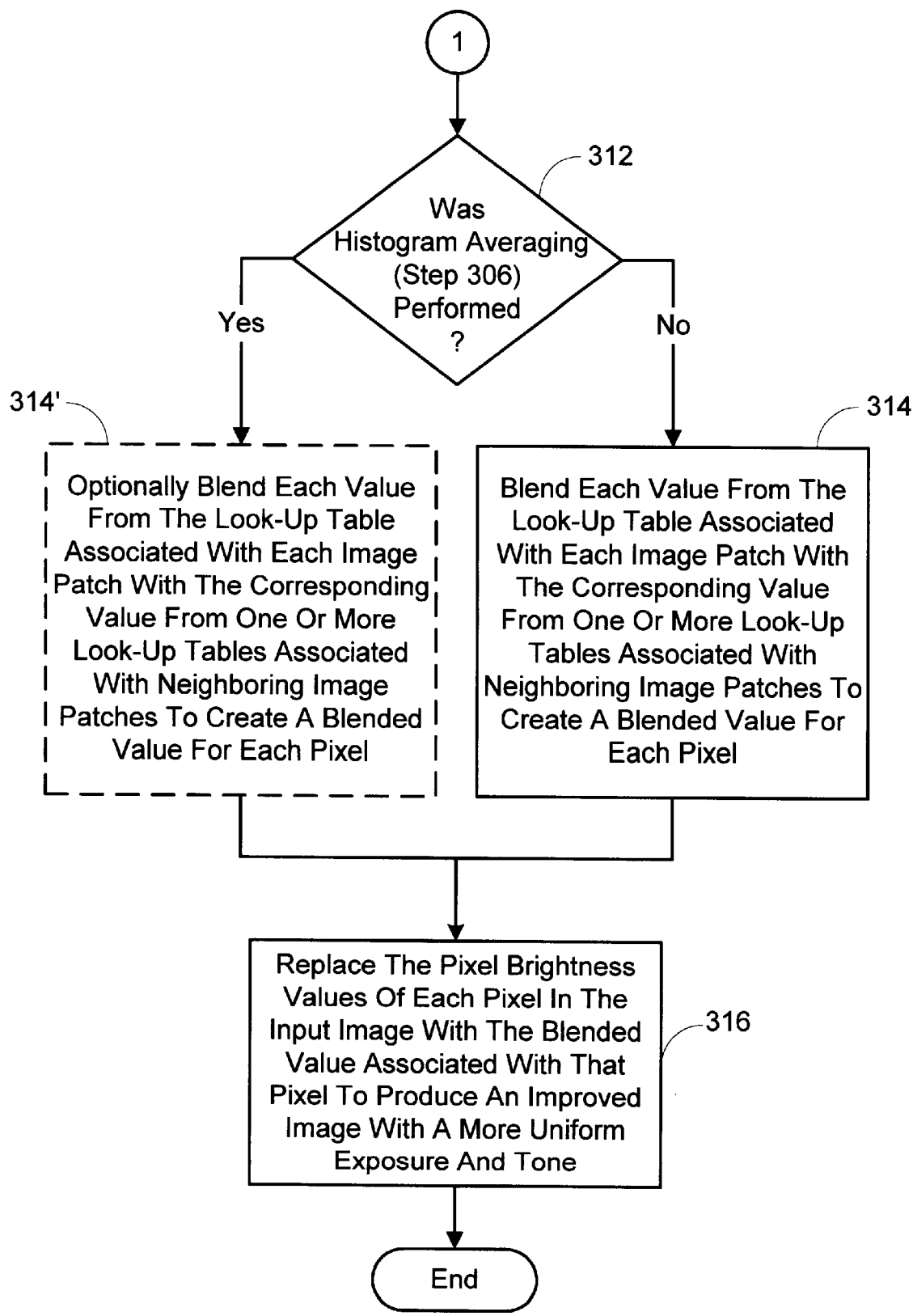

Referring to FIG. 3, the locally adapted histogram equalization process entails first inputting an image that is to be processed to produce a more uniform exposure and tone throughout the image (process action 300). The input image is divided into image patches in process action 302. These image patches are preferably square regions of the image, although other shapes are possible or even object-specific regions (i.e., regions containing related parts of the images). Each patch can be of any size desired. A pixel brightness level histogram is then created for each image patch in process action 304. Specifically, the histograms are created by counting the number of pixels exhibiting a particular brightness level in an image patch. The histograms associated with each image patch are then optionally averaged with those of their neighbors in process action 306. The block depicting this process action in FIG. 3A is shown with a broken line to indicate its optional nature, as will all other optional process actions described herein. It is feasible to use any conventional neighborhood averaging method for process action 306. However, it is preferred that a "kernel" averaging operation be used where the histogram count value at each brightness level for a particular patch is replaced with the average of itself and a desired number of its neighbors. Further, it is preferred that the contribution of each histogram count value be weighted so as to give preference to the value being averaged. The resulting products are summed to produce the revised count value which is to be used as a replacement for the count value being averaged. The weighting factors applied to each neighboring count value preferably decrease with the distance of the neighboring patch from the patch being averaged. The number of neighbors whose histograms are employed in the averaging process can vary anywhere from one up to all the patches in the image. It is also noted that this averaging process can be iterative in that once a revised histogram count value has been calculated for the count values associated with the histogram of each patch, the averaging process could be repeated using the revised histogram count values to produce new revised values.

The next process action 308 in the locally adapted histogram equalization process involves computing a normalized cumulative distribution function for each image patch from the averaged histogram associated with that patch. The aforementioned distribution function is computed by first creating a standard cumulative distribution function that identifies, for each brightness level of the histogram, the number of pixel at or below that level. The cumulative distribution is then normalized to make the maximum count correspond to the maximum brightness level.

Figure 1:
FIG. 1 is an image depicting an office scene exhibiting a non-uniform exposure and tone.
Figure 4:
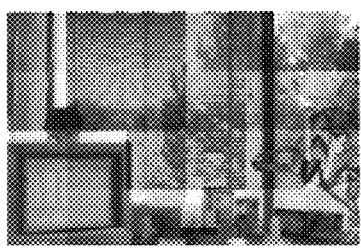
FIG. 4 is an image of the office scene of FIG. 1 which has been processed using a traditional histogram equalization approach on each of a plurality of image patches causing the image to be "patchy" in appearance.

Once the normalized cumulative distribution function has been computed, the next process action 310 in the process is to create a look-up table for each image patch. This is accomplished by associating a normalized cumulative count for each brightness level. These counts represent revised pixel brightness values. It would be possible to equalize each patch by simply replacing the existing brightness values of each pixel with the revised values identified in the lookup table for the particular patch to which the pixel belongs. This approach would be akin to the previously described histogram equalization methods typically used to equalize the pixel brightness values across an entire image. However, such an approach could result in a "patchy" image. For example, referring to FIG. 4, the results of such a process without smoothing can be seen using the image of the office scene of FIG. 1. As can be seen there are clear demarcations between each patch of the image. To prevent this patchy look, it would be possible to apply a large amount of histogram smoothing to the image. However, this may result in a blurred image.

A more preferred approach involves in essence equalizing each pixel using a blend of the equalizations appropriate for the pixel's patch and its neighboring patches. Another way of saying this is that a per-pixel adapted equalization is applied, where the equalization function is interpolated from neighboring per-patch equalization functions so as to continuously vary the equalization across the image. This approach can be optional if the aforementioned histogram averaging was performed, as it might not be needed to produce the desired results. However, it is preferred that the equalization be performed, even if the histogram averaging process action was applied, and is especially if the histogram averaging was not performed. When performed, the equalization is preferably accomplished as follows. As indicated in process action 312 of FIG. 3B, it is first determined if the aforementioned histogram averaging was applied. If it was not, then the desired equalization is achieved by blending each value from the look-up table associated with each image patch with the corresponding value (i.e., the value corresponding to the same original brightness level) of one or more look-up tables associated with neighboring image patches (process action 314). This process produces a new blended value for each pixel. These blended values represent the new pixel brightness levels which are to be used in place of the original brightness levels for each pixel of the image. It is noted that if it is determined in process action 312 that the aforementioned histogram averaging was previously performed, the foregoing equalization process can be optionally applied, as indicated in process action 314'.

While it is feasible to use any conventional blending method for the blending process action, it is preferred that either a bilinear or biquadratic interpolator function be employed. It is believed these functions will provide the desired smooth looking image at a reasonable computational cost. The interpolator function essentially involves finding a function (either a linear function or quadratic-function) that best approximates the distribution of the previously computed pixel brightness values associated with each original brightness level among the look-up tables for the various patches involved in the equalization process. The number and relative location of neighboring patches whose look-up tables are employed will depend on the interpolator function chosen for the task, as is the weight given to each value taken from a neighboring patch's look-up table. These parameters are well known in the art and will not be described in detail in the present description. Once the equalization is complete, the previously computed brightness values associated with a particular original brightness level are replaced in look-up table of each patch with a value derived from the interpolator function.

Finally, the blended pixel brightness values are used to replace the corresponding original values for each pixel in the associated patch (process action 316). This procedure results in a smoother looking image having more uniform exposure and tone characteristics, and without the previously mentioned blurring effect.

2.0. Exemplary Implementation

Figure 5A:
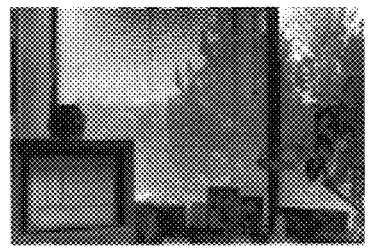
FIG. 5A is an image produced using the locally adapted histogram equalization process of FIG. 3 where a bilinear interpolator function was employed to accomplish the blending action of the process.
Figure 5B:
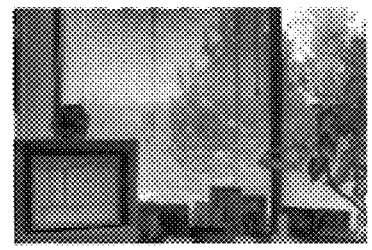
FIG. 5B is an image produced using the locally adapted histogram equalization process of FIG. 3 where a biquadratic interpolator function was employed to accomplish the blending action of the process.

The foregoing locally adapted histogram equalization process was employed to produce the images shown in FIGS. 5A and 5B. It should be noted that the input image used to produce these images was actually a summed brightness image made up of a plurality of images captured at different exposure settings, rather than a standard digital image. This summed brightness image is described in a co-pending U.S. patent application entitled "A SYSTEM AND PROCESS FOR IMPROVING THE UNIFORMITY OF THE EXPOSURE AND TONE OF A DIGITAL IMAGE" having Ser. No. 09/334,860 and a filing date of Jun. 16, 1999. The subject matter of this co-pending application is hereby incorporated by reference. While, the present invention can be used to improve the uniformity of the exposure and tone of any digital image, it is particularly useful in respect to the system and process described in the co-pending application. Thus, the advantages of the present invention will be explained in the context of the summed brightness image and equalization methods of the co-pending application.

As described in the co-pending application the summed brightness image is an image formed by adding together corresponding pixels of multiple, differently-exposed images of a static scene. The purpose for generating such an image was to produce a better looking image from the composite of the multiple images. This can be accomplished because it was found that objects depicted in an image of a scene tend to vary in detail depending on the exposure setting. For example, it was found in one experiment that objects in the background of an image appeared in greater detail in an underexposed image, while objects in the foreground showed more detail in an overexposed image. The goal of the subject invention of the aforementioned co-pending application is to produce a composite image that captures to some extent, the portions of each image providing the best exposure and tone characteristics.

In general, it was described in the co-pending application that this goal can be achieved by analyzing a set of bracketed images (i.e., images of a static scene taken at different exposure settings) using a histogram equalization process involving the creation of a count of the number of pixels sets (i.e., a group of corresponding pixels from the bracketed images) having the same summed brightness level. From this count, a cumulative distribution function is computed and normalized to a maximum value corresponding to the maximum summed brightness level. The cumulative distribution function is then used to determine new pixel brightness levels to use in generating the composite image. Specifically, the normalized cumulative count value that corresponds to the summed brightness value associated with each pixel set is identified and divided by the number of images in the set of bracketed images to produce a new pixel brightness value associated with each pixel set. The composite image is generated by using the new pixel brightness value associated with a pixel set as the pixel value for a pixel in the composite image corresponding to the location of the pixels of the associated pixel set in the scene depicted by the images.

As is apparent, the foregoing process associated with the co-pending application involves an image-wide histogram equalization process. Such a process has drawbacks (as described previously) that can be resolved using the locally adapted histogram equalization process according to the present invention. Thus, in this example, the brightness values being manipulated for a part of the process are actually summed brightness values, rather than typical pixel brightness values. However, the process is the same with the exception that the final blended values of the lookup tables are first divided by the number of images making up the summed image to restore the original gamut.

Specifically, the summed brightness image of the interior of the office was segmented into 24 equally-sized, square patches. Histograms were generated for each patch and averaged using an iterated separable kernel of (¼ ½ ¼), and two iterations. The cumulative distribution functions and resulting look-up tables were then created for each patch. Then, for each patch, the last revised normalized count value (which represents a new pixel brightness level) for each original brightness level was blended with the corresponding values from the lookup tables of neighboring patches in the image. This blending was accomplished using a bilinear interpolator function to produce the image shown in FIG. 5A, and using a biquadratic interpolator function to produce the image shown in FIG. 5B. It is hard to see much difference between using bilinear and biquadratic interpolator functions in this example. Note however that there is a slight "dark smearing" effect can be seen at the top of the monitor in FIG. 5A which was eliminated in FIG. 5B using the biquadratic interpolator function. Also note that the blended pixel values were divided by the number of images making up the summed brightness image being process, as mentioned previously. Had a standard digital image been processed, this division process action would not be necessary.

One of the things that can be noticed in the images of FIGS. 5A and 5B, if they are examined closely, is that equalization accentuates the noise along the white wall right at the left edge of the image. In areas with only a single color, histogram equalization, even locally adapted histogram equalization, will stretch that color to fill the whole gamut, and hence really accentuate any noise. This noise problem can be mitigated by implementing a further refinements to the equalization process.

3.0. Refinement Techniques

One refinement approach is to only partially equalize the portion of the image containing a large single-color region. This partial equalization process was described fully in the aforementioned co-pending application it the context of an image-wide refinement process. This process can be advantageously adapted here in the individual patches of the image being process, and more preferably to just those patches containing large single-color regions likely to create the aforementioned noise. In essence, partial equalization can be described graphically as the blending of the a plot of the aforementioned normalized cumulative distribution function with a straight line. While the foregoing blending operation does mitigate the effects of noise, it may not produce the optimum improvement in exposure and tone in the composite image. This situation can be avoided by weighting the blending operation so that the straight line function contributes less than 100% to the combined function. Thus, the contribution of the straight line function to the combined function could vary anywhere from 0% (i.e., no contribution) to 100% (i.e., equal weighting). The choice of what particular contribution percentage should be used in the blending operation will depend on the images being processed, with the goal being to produce a composite image having the best possible improvement in exposure and tone uniformity in comparison to the original image. For example, a scene depicted in the image patch that has large areas of a single color will typically require a greater contribution percentage from the straight line function in order to mitigate the resulting noise and produce the best possible improvement in the final image. Whereas, an image patch having fewer large single color areas will not require as much (if any) blending to produce the best possible improvement.

Another possible approach to the noise problem would be to limit the "gain" in any section of the lookup table. For example, the difference between a look-up table value representing the new, blended value and the associated original brightness level would be limited to some prescribed maximum. If the difference exceeds the prescribed maximum, the blended value would be replaced with the prescribed maximum value.

4.0. Pixel Brightness Levels

Up to this point the histogram equalization has been described as being based on the brightness levels of the pixels. This assumes that the red, green and blue channels of a color image can be equalized based on equalizing the brightness. While it is believe this assumption will produce acceptable results, it is possible to use a different approach. For example, each color channel could be equalized separately. However, this may result in the hue being affected. For example, there may be a large variation in the red channel and a small variation in the blue channel. A per-channel histogram equalization approach would stretch the blue cannel more than the red, thereby effecting the hue. Another possibility would be to employ the Y luminance channel (i.e. Y=0.6G+0.3R+0.1B) used in video coding to represent the pixel brightness level in the equalization process, and then adjust the color channels by the ratio of the new (equalized) to old luminance. Other conventional characterizations of the pixel color, such as hue saturation values for example, can also be employed as desired to represent the brightness level in the process.

What is claimed is:

1. A computer-implemented process for improving the uniformity in exposure and tone of a digital image, said process comprising using a computer to perform the following acts:

segmenting the digital image into a plurality of image patches;

for each image patch, creating a pixel brightness level histogram which identifies a respective pixel count for each of a plurality of original pixel brightness levels exhibited by the pixels of the patch;

averaging said pixel brightness level histogram with the histograms associated with a prescribed number of neighboring image patches to produce an averaged histogram;

for each image patch, generating a normalized cumulative distribution function based on the histogram, wherein a maximum cumulative count value thereof corresponds to a maximum original pixel brightness level, and wherein said normalized cumulative distribution function identifies a respective new pixel brightness level for each of the original pixel brightness levels as represented by the normalized pixel count value corresponding to each respective original pixel brightness level;

for each image patch, respectively blending the new pixel brightness level associated with each of the original pixel brightness levels with the new pixel brightness level associated with the same original pixel brightness level in at least one neighboring image patch; and for each image patch, replacing the original pixel brightness level of each pixel in the image patch with the blended pixel brightness level corresponding to that original brightness level, to produce a final image exhibiting improved uniformity in exposure and tone.

2. The process of claim 1, wherein the act of segmenting comprises the act of segmenting the digital image into a plurality of square image patches of equal size.

3. The process of claim 1, wherein the act of averaging comprises the act of using kernel averaging.

4. The process of claim 3, wherein the act of kernel averaging comprises the act of weighting the pixel brightness histograms involved in the averaging process so as to give preference to the histogram of the image patch being averaged.

5. The process of claim 4, wherein the act of weighting comprises the act of weighting the histograms of the neighboring patches in such a way that the contribution of a histogram of a neighboring patch to said averaged histogram decreases with the distance of that patch from the patch whose histogram is being averaged.

6. The process of claim 1, further comprising the act of repeating the act of averaging a prescribed number of times.

7. The process of claim 1, wherein the pixel brightness levels comprise pixel gray levels.

8. The process of claim 1, wherein the digital image being processed comprises a color image and the pixel brightness level is modeled by the Y-luminance channel, and wherein the red, green and blue pixel levels of each pixel in the final image are determined in accordance with a change in the Y-luminance channel.

9. A system for improving the uniformity in exposure and tone of a digital image, comprising:

a general purpose computing device;

a computer program comprising program modules executable by the computing device, wherein the computing device is directed by the program modules of the computer program to, segment the digital image into a plurality of sub-image sectors referred to hereinafter as image patches, for each image patch, create a histogram which identifies a respective pixel count for each of a plurality of original pixel brightness levels exhibited by the pixels of the patch, said pixel count representing the number of image patch pixels exhibiting a particular pixel brightness level, performing an averaging of the pixel count of each of the plurality of original pixel brightness levels with the pixels counts associated with the corresponding brightness levels of a prescribed number of neighboring image patches to produce an averaged histogram for each image patch, for each image patch, generate a cumulative distribution function based on the histogram, for each image patch, normalize the cumulative distribution function so that a maximum cumulative count value thereof corresponds to the maximum original pixel brightness level, for each image patch, create a look-up table from the normalized cumulative distribution function that associates each original pixel brightness level to a new pixel brightness level represented by the normalized pixel count value associated with that original pixel brightness level, for each image patch, respectively blend the new pixel brightness level associated with each of the original pixel brightness levels with the new pixel brightness level associated with the same original pixel brightness level in at least one neighboring image patch, and for each image patch, replace the original pixel brightness level of each pixel in the image patch with the blended pixel brightness level of the patch's look-up table corresponding to that original brightness level, to produce a final image exhibiting improved uniformity in exposure and tone.

10. The system of claim 9, wherein the segmenting program module comprises a sub-module for segmenting the digital image into a plurality of square image patches of equal size.

11. The system of claim 9, wherein the averaging program module comprises a sub-module for using kernel averaging.

12. The system of claim 11, wherein the sub-module for kernel averaging comprises a sub-module for weighting the pixel brightness histograms involved in the averaging module so as to give preference to the histogram of the image patch being averaged.

13. The system of claim 12, wherein the weighting sub-module comprises a sub-module for weighting the histograms of the neighboring patches in such a way that the contribution of a histogram of a neighboring patch to said averaged histogram decreases with the distance of that patch from the patch whose histogram is being averaged.

14. The system of claim 9, further comprising a program module for repeating the averaging module a prescribed number of times.

15. A computer-readable memory for causing a computer to improve the uniformity in exposure and tone of a digital image, comprising:

a computer-readable storage medium; and a computer program comprising program modules stored in the storage medium, wherein the storage medium is so configured by the computer program that it causes the computer to, segment the digital image into a plurality of image patches, for each image patch, create a histogram which identifies a respective pixel count for each of a plurality of original pixel brightness levels exhibited by the pixels of the patch, performing an averaging of the pixel count of each of the plurality of original pixel brightness levels with the pixels counts associated with the corresponding brightness levels of a prescribed number of neighboring image patches to Produce an averaged histogram for each image patch, for each image patch, generate a cumulative distribution function based on the histogram, for each image patch, normalize the cumulative distribution function so that a maximum cumulative count value thereof corresponds to the maximum original pixel brightness level, and wherein said normalized cumulative distribution function identifies a respective new pixel brightness level for each of the original pixel brightness levels as represented by the normalized pixel count value corresponding to each respective original pixel brightness level, for each image patch, respectively blend the new pixel brightness level associated with each of the original pixel brightness levels with the new pixel brightness level associated with the same original pixel brightness level in at least one neighboring image patch, and for each image patch, replace the original pixel brightness level of each pixel in the image patch with the blended pixel brightness level corresponding to that original brightness level, to produce a final image exhibiting improved uniformity in exposure and tone.

16. The computer-readable memory of claim 15, wherein the segmenting program module comprises a sub-module for segmenting the digital image into a plurality of square image patches of equal size.

17. The computer-readable memory of claim 15, wherein the averaging program module comprises a sub-module for using kernel averaging.

18. The computer-readable memory of claim 17, wherein the sub-module for kernel averaging comprises a sub-module for weighting the pixel brightness histograms involved in the averaging module so as to give preference to the histogram of the image patch being averaged.

19. The computer-readable memory of claim 18, wherein the weighting sub-module comprises a sub-module for weighting the histograms of the neighboring patches in such a way that the contribution of a histogram of a neighboring patch to said averaged histogram decreases with the distance of that patch from the patch whose histogram is being averaged.

20. The computer-readable memory of claim 15 further comprising the a program module for repeating the averaging module a prescribed number of times.

21. The computer-readable memory of claim 15, wherein the blending program module comprises a sub-module for using a bilinear interpolator function to blend the new pixel brightness levels.

22. The computer-readable memory of claim 15, wherein the blending program module comprises a sub-module for using a biquadratic interpolator function to blend the new pixel brightness levels.

23. The computer-readable memory of claim 15, further comprising a program module for blending the normalized cumulative distribution function of an image patch exhibiting noise caused by areas of a single color in the scene depicted in the patch with a straight line function to produce a blended distribution function which reduces the reduces the effects of said noise, wherein said blended normalized cumulative distribution function is employed to identify the respective new pixel brightness level for each of the original pixel brightness levels as represented by the blended and normalized pixel count value corresponding to each respective original pixel brightness level.

24. The computer-readable memory of claim 23, wherein the program module for blending the normalized cumulative distribution function with a straight line function comprises a sub-module for assigning a weighting factor to the straight line function that determines a degree to which the straight line function contributes to the blended distribution function.

25. The computer-readable memory of claim 15, further comprising a program module for limiting the gain exhibited by any of the blended pixel brightness levels associated with an image patch, in comparison to its associated original pixel brightness level, to a prescribed level, said prescribed level being chosen so as to mitigate the effects of noise caused by areas of a single color in the scene depicted in the image patch.

26. A computer-implemented process for improving the uniformity in exposure and tone of a digital image, said process comprising using a computer to perform the following acts:

segmenting the digital image into a plurality of image patches;

for each image patch, creating a pixel brightness level histogram which identifies a respective pixel count for each of a plurality of original pixel brightness levels exhibited by the pixels of the patch;

for each image patch, averaging said pixel brightness level histogram with the histograms associated with a prescribed number of neighboring image patches to produce an averaged histogram;

for each image patch, generating a normalized cumulative distribution function based on the averaged histogram, wherein a maximum cumulative count value thereof corresponds to a maximum original pixel brightness level, and wherein said normalized cumulative distribution function identifies a respective new pixel brightness level for each of the original pixel brightness levels as represented by the normalized pixel count value corresponding to each respective original pixel brightness level;

for each image patch, replacing the original pixel brightness level of each pixel in the image patch with the new pixel brightness level corresponding to that original brightness level, to produce a final image exhibiting improved uniformity in exposure and tone.

27. A computer-implemented process for generating a composite image that exhibits an improved uniformity in both exposure and tone in comparison to a set of digital input images each of which exhibits a different exposure level, said process comprising using a computer to perform the following acts:

accessing said set of digital images;

computing a summed brightness level for each pixel set in the set of images by adding the brightness level exhibited by each pixel in a pixel set to produce a summed brightness image, wherein a pixel set comprises a pixel from each image of the image set which represents the same portion of the scene depicted by the set of images;

segmenting the summed brightness image into a plurality of image patches;

for each image patch, creating a pixel brightness level histogram which identifies a respective pixel count for each of a plurality of original summed brightness levels exhibited by the pixel sets of the patch;

for each image patch, averaging said pixel brightness level histogram with the histograms associated with a prescribed number of neighboring image patches to produce an averaged histogram;

for each image patch, generating a normalized cumulative distribution function based on the averaged histogram, wherein a maximum cumulative count value thereof corresponds to a maximum original summed brightness level, and wherein said normalized cumulative distribution function identifies a respective new summed brightness level for each of the original summed brightness levels as represented by the normalized pixel count value corresponding to each respective original summed brightness level;

for each image patch, respectively blending the new pixel brightness level associated with each of the original pixel brightness levels with the new pixel brightness level associated with the same original pixel brightness level in at least one neighboring image patch;

for each image patch, replacing the original summed brightness level of each pixel in the image patch with the blended summed brightness level corresponding to that original summed brightness level; and for each image patch, dividing each blended summed brightness level by the number of digital images in the set of images to produce a final image exhibiting improved uniformity in exposure and tone.

28. A computer-implemented process for improving the uniformity in exposure and tone of a digital image, said process comprising using a computer to perform the following acts:

segmenting the digital image into a plurality of image patches;

for each image patch, creating a pixel brightness level histogram which identifies a respective pixel count for each of a plurality of original pixel brightness levels exhibited by the pixels of the patch;

for each image patch, generating a normalized cumulative distribution function based on the histogram, wherein a maximum cumulative count value thereof corresponds to a maximum original pixel brightness level, and wherein said normalized cumulative distribution function identifies a respective new pixel brightness level for each of the original pixel brightness levels as represented by the normalized pixel count value corresponding to each respective original pixel brightness level;

for each image patch, respectively blending the new pixel brightness level associated with each of the original pixel brightness levels with the new pixel brightness level associated with the same original pixel brightness level in at least one neighboring image patch using a bilinear interpolator function to blend the new pixel brightness levels; and for each image patch, replacing the original pixel brightness level of each pixel in the image patch with the blended pixel brightness level corresponding to that original brightness level, to produce a final image exhibiting improved uniformity in exposure and tone.

29. A computer-implemented process for improving the uniformity in exposure and tone of a digital image, said process comprising using a computer to perform the following acts:

segmenting the digital image into a plurality of image patches;

for each image patch, creating a pixel brightness level histogram which identifies a respective pixel count for each of a plurality of original pixel brightness levels exhibited by the pixels of the patch;

for each image patch, generating a normalized cumulative distribution function based on the histogram, wherein a maximum cumulative count value thereof corresponds to a maximum original pixel brightness level, and wherein said normalized cumulative distribution function identifies a respective new pixel brightness level for each of the original pixel brightness levels as represented by the normalized pixel count value corresponding to each respective original pixel brightness level;

for each image patch, respectively blending the new pixel brightness level associated with each of the original pixel brightness levels with the new pixel brightness level associated with the same original pixel brightness level in at least one neighboring image patch using a biquadratic interpolator function to blend the new pixel brightness levels; and for each image patch, replacing the original pixel brightness level of each pixel in the image patch with the blended pixel brightness level corresponding to that original brightness level, to produce a final image exhibiting improved uniformity in exposure and tone.

30. A computer-implemented process for improving the uniformity in exposure and tone of a digital image, said process comprising using a computer to perform the following acts:

- segmenting the digital image into a plurality of image patches;
- for each image patch, creating a pixel brightness level histogram which identifies a respective pixel count for each of a plurality of original pixel brightness levels exhibited by the pixels of the patch;
- for each image patch, generating a normalized cumulative distribution function based on the histogram, wherein a maximum cumulative count value thereof corresponds to a maximum original pixel brightness level, and wherein said normalized cumulative distribution function identifies a respective new pixel brightness level for each of the original pixel brightness levels as represented by the normalized pixel count value a corresponding to each respective original pixel brightness level;
- for each image patch, respectively blending the new pixel brightness level associated with each of the original pixel brightness levels with the new pixel brightness level associated with the same original pixel brightness level in at least one neighboring image patch;
- for each image patch, replacing the original pixel brightness level of each pixel in the image patch with the blended pixel brightness level corresponding to that original brightness level, to produce a final image exhibiting improved uniformity in exposure and tone; and
- blending the normalized cumulative distribution function of an image patch exhibiting noise caused by areas of a single color in the scene depicted in the patch with a straight line function to produce a blended distribution function which reduces the reduces the effects of said noise, wherein said blended normalized cumulative distribution function is employed to identify the respective new pixel brightness level for each of the original pixel brightness levels as represented by the blended and normalized pixel count value corresponding to each respective original pixel brightness level.

31. The process of claim 30, wherein the act of blending the normalized cumulative distribution function with a straight line function comprises the act of assigning a weighting factor to the straight line function that determines a degree to which the straight line function contributes to the blended distribution function.

32. The process of claim 31, wherein the weighting factor associated with the straight line function varies in a range which causes the contribution of the straight line function to the blended distribution function to vary anywhere from 0 percent to 100 percent.

33. A computer-implemented process for improving the uniformity in exposure and tone of a digital image, said process comprising using a computer to perform the following acts:

- segmenting the digital image into a plurality of image patches;
- for each image patch, creating a pixel brightness level histogram which identifies a respective pixel count for each of a plurality of original pixel brightness levels exhibited by the pixels of the patch;
- for each image patch, generating a normalized cumulative distribution function based on the histogram, wherein a maximum cumulative count value thereof corresponds to a maximum original pixel brightness level, and wherein said normalized cumulative distribution function identifies a respective new pixel brightness level for each of the original pixel brightness levels as represented by the normalized pixel count value corresponding to each respective original pixel brightness level;
- for each image patch, respectively blending the new pixel brightness level associated with each of the original pixel brightness levels with the new pixel brightness level associated with the same original pixel brightness level in at least one neighboring image patch;
- for each image patch, replacing the original pixel brightness level of each pixel in the image patch with the blended pixel brightness level corresponding to that original brightness level, to produce a final image exhibiting improved uniformity in exposure and tone; and
- limiting the gain exhibited by any of the blended pixel brightness levels associated with an image patch, in comparison to its associated original pixel brightness level, to a prescribed level, said prescribed level being chosen so as to mitigate the effects of noise caused by areas of a single color in the scene depicted in the image patch.

34. A system for improving the uniformity in exposure and tone of a digital image, comprising:

- a general purpose computing device;
- a computer program comprising program modules executable by the computing device, wherein the computing device is directed by the program modules of the computer program to,
  - segment the digital image into a plurality of sub-image sectors referred to hereinafter as image patches,
  - for each image patch, create a histogram which identifies a respective pixel count for each of a plurality of original pixel brightness levels exhibited by the pixels of the patch, said pixel count representing the number of image patch pixels exhibiting a particular pixel brightness level,
  - performing an averaging of the pixel count of each of the plurality of original pixel brightness levels with the pixels counts associated with the corresponding brightness levels of a prescribed number of neighboring image patches to produce an averaged histogram for each image patch,
  - for each image patch, generate a cumulative distribution function based on the histogram,
  - for each image patch, normalize the cumulative distribution function so that a maximum cumulative count value thereof corresponds to the maximum original pixel brightness level,
  - for each image patch, create a look-up table from the normalized cumulative distribution function that associates each original pixel brightness level to a new pixel brightness level represented by the normalized pixel count value associated with that original pixel brightness level,
  - for each image patch, respectively blend the new pixel brightness level associated with each of the original pixel brightness levels with the new pixel brightness level associated with the same original pixel brightness level in at least one neighboring image patch, and
  - for each image patch, replace the original pixel brightness level of each pixel in the image patch with the blended pixel brightness level of the patch's look-up table corresponding to that original brightness level, to produce a final image exhibiting improved uniformity in exposure and tone.

35. A system for improving the uniformity in exposure and tone of a digital image, comprising:
 a general purpose computing device;
 a computer program comprising program modules executable by the computing device, wherein the computing device is directed by the program modules of the computer program to,
  segment the digital image into a plurality of sub-image sectors referred to hereinafter as image patches,
  for each image patch, create a histogram which identifies a respective pixel count for each of a plurality of original pixel brightness levels exhibited by the pixels of the patch, said pixel count representing the number of image patch pixels exhibiting a particular pixel brightness level,
  for each image patch, generate a cumulative distribution function based on the histogram,
  for each image patch, normalize the cumulative distribution function so that a maximum cumulative count value thereof corresponds to the maximum original pixel brightness level,
  for each image patch, create a look-up table from the normalized cumulative distribution function that associates each original pixel brightness level to a new pixel brightness level represented by the normalized pixel count value associated with that original pixel brightness level,
  for each image patch, respectively blend the new pixel brightness level associated with each of the original pixel brightness levels with the new pixel brightness level associated with the same original pixel brightness level in at least one neighboring image patch, said blending comprising any of a sub-module for using a bilinear interpolator function to blend the new pixel brightness levels, and a sub-module for using a biquadratic interpolator function to blend the new pixel brightness levels, and
  for each image patch, replace the original pixel brightness level of each pixel in the image patch with the blended pixel brightness level of the patch's look-up table corresponding to that original brightness level, to produce a final image exhibiting improved uniformity in exposure and tone.

36. A system for improving the uniformity in exposure and tone of a digital image, comprising:
 a general purpose computing device;
 a computer program comprising program modules executable by the computing device, wherein the computing device is directed by the program modules of the computer program to,
  segment the digital image into a plurality of sub-image sectors referred to hereinafter as image patches,
  for each image patch, create a histogram which identifies a respective pixel count for each of a plurality of original pixel brightness levels exhibited by the pixels of the patch, said pixel count representing the number of image patch pixels exhibiting a particular pixel brightness level,
  for each image patch, generate a cumulative distribution function based on the histogram,
  for each image patch, normalize the cumulative distribution function so that a maximum cumulative count value thereof corresponds to the maximum original pixel brightness level,
  blending the normalized cumulative distribution function of an image patch exhibiting noise caused by areas of a single color in the scene depicted in the patch with a straight line function to produce a blended distribution function which reduces the reduces the effects of said noise, wherein said blended normalized cumulative distribution function is employed to identify the respective new pixel brightness level for each of the original pixel brightness levels as represented by the blended and normalized pixel count value corresponding to each respective original pixel brightness level,
  for each image patch, create a look-up table from the normalized cumulative distribution function that associates each original pixel brightness level to a new pixel brightness level represented by the normalized pixel count value associated with that original pixel brightness level,
  for each image patch, respectively blend the new pixel brightness level associated with each of the original pixel brightness levels with the new pixel brightness level associated with the same original pixel brightness level in at least one neighboring image patch, and
  for each image patch, replace the original pixel brightness level of each pixel in the image patch with the blended pixel brightness level of the patch's look-up table corresponding to that original brightness level, to produce a final image exhibiting improved uniformity in exposure and tone.

37. The system of claim 36, wherein the program module for blending the normalized cumulative distribution function with a straight line function comprises a sub-module for assigning a weighting factor to the straight line function that determines a degree to which the straight line function contributes to the blended distribution function.

38. A system for improving the uniformity in exposure and tone of a digital image, comprising:
 a general purpose computing device;
 a computer program comprising program modules executable by the computing device, wherein the computing device is directed by the program modules of the computer program to,
  segment the digital image into a plurality of sub-image sectors referred to hereinafter as image patches,
  for each image patch, create a histogram which identifies a respective pixel count for each of a plurality of original pixel brightness levels exhibited by the pixels of the patch, said pixel count representing the number of image patch pixels exhibiting a particular pixel brightness level,
  for each image patch, generate a cumulative distribution function based on the histogram,
  for each image patch, normalize the cumulative distribution function so that a maximum cumulative count value thereof corresponds to the maximum original pixel brightness level,
  for each image patch, create a look-up table from the normalized cumulative distribution function that associates each original pixel brightness level to a new pixel brightness level represented by the normalized pixel count value associated with that original pixel brightness level,
  for each image patch, respectively blend the new pixel brightness level associated with each of the original pixel brightness levels with the new pixel brightness level associated with the same original pixel brightness level in at least one neighboring image patch,
  limiting the gain exhibited by any of the blended pixel brightness levels associated with an image patch, in comparison to its associated original pixel brightness level, to a prescribed level, said prescribed level being chosen so as to mitigate the effects of noise caused by areas of a single color in the scene depicted in the image patch, and for each image patch, replace the original pixel brightness level of each pixel in the image with the blended pixel brightness level of the patch's look-up table corresponding to that original brightness level, to produce a final image exhibiting improved uniformity in exposure and tone.

* * * * *